United States Patent
Kim et al.

(10) Patent No.: US 10,348,439 B1
(45) Date of Patent: Jul. 9, 2019

(54) SPECTRAL SLOT ASSIGNMENT AND PLACEMENT OF WAVELENGTH SHIFTERS IN FLEXIBLE GRID OPTICAL NETWORKS

(71) Applicant: Fujitsu Limited, Kawasaki-shi, Kanagawa (JP)

(72) Inventors: Inwoong Kim, Allen, TX (US); Xi Wang, Murphy, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/978,879

(22) Filed: May 14, 2018

(51) Int. Cl.
*H04J 14/02* (2006.01)
*H04L 12/24* (2006.01)
*H04Q 11/00* (2006.01)

(52) U.S. Cl.
CPC ...... *H04J 14/0212* (2013.01); *H04J 14/0217* (2013.01); *H04J 14/0257* (2013.01); *H04L 41/0826* (2013.01); *H04Q 11/0005* (2013.01); *H04Q 11/0062* (2013.01); *H04Q 2011/0047* (2013.01); *H04Q 2011/0079* (2013.01)

(58) Field of Classification Search
CPC .................................................. H04J 14/0227
See application file for complete search history.

(56) References Cited

U.S. PATENT DOCUMENTS

| 2013/0308945 | A1* | 11/2013 | Dhillon ............. H04Q 11/0003 398/48 |
| 2016/0241353 | A1* | 8/2016 | Wright ............... H04J 14/0256 |
| 2017/0104632 | A1 | 4/2017 | Kim et al. |
| 2018/0006757 | A1* | 1/2018 | Prakash ................. H04B 10/27 |

OTHER PUBLICATIONS

Ishii, Kiyo, et al. "Network utilization improvement using format-agnostic multi-channel wavelength converters." Optical Fiber Communications Conference and Exhibition (OFC), 2017. IEEE, 2017; 3 pages.

(Continued)

*Primary Examiner* — Shi K Li
(74) *Attorney, Agent, or Firm* — Baker Botts L.L.P.

(57) ABSTRACT

A control system for spectral slot assignment in flexible grid optical networks determines, for a given optical path, a physical source node, a physical destination node, and physical intermediate nodes, determines the number of contiguous spectral slots to allocate for traffic on the path, identifies candidate combinations of spectral slots available for the traffic, and creates an auxiliary graph for the path. The auxiliary graph includes auxiliary links representing candidate combinations of spectral slots, virtual nodes representing pairs of neighboring physical nodes, and auxiliary links between each pair of virtual source-side and destination-side intermediate nodes representing either pass-through traffic or wavelength shifted traffic. The control system assigns cost values to the auxiliary links, determines a lowest cost combination of auxiliary links from the source to the destination, allocates the corresponding candidate combinations of spectral slots to the traffic, and configures the physical intermediate nodes accordingly.

20 Claims, 8 Drawing Sheets

(56) References Cited

OTHER PUBLICATIONS

Tan, Hung Nguyen, et al. "Cascaded operation of wavelength converter for dual-polarization phase-modulated signal." Optical Fibre Technology, 2014 OptoElectronics and Communication Conference and Australian Conference on. IEEE, 2014; 3 pages.

Wang, Xi, et al. "Efficient all-optical wavelength converter placement and wavelength assignment in optical networks." Optical Fiber Communication Conference. Optical Society of America, 2016; 3 pages.

* cited by examiner

SPECTRAL SLOT ASSIGNMENT AND PLACEMENT OF WAVELENGTH SHIFTERS IN FLEXIBLE GRID OPTICAL NETWORKS

BACKGROUND

Field of the Disclosure

The present disclosure relates generally to optical communication networks and, more particularly, to spectral slot assignment and placement of wavelength shifters in flexible grid optical networks.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, couplers, etc. configured to perform various operations within the network.

The function of computation of an optical signal path through the various network elements is a core function for design, modeling, management, and control of optical networks. Optical path computation may enable operators of an optical network to customize, control and update network elements and policies. One feature of optical path computation involves determination of end-to-end reachable optical paths from a source node to a destination node. When the source node and the destination node are determined to be 'directly reachable', then one or more paths exist in the optical network between the source node and the destination node that are all-optical paths.

Absent direct reachability from the source node to the destination node, an optical signal will typically be electrically regenerated using optical-electrical-optical (O-E-O) regenerators along a given signal path. When regenerators are used, an end-to-end reachable path may include a certain number of regenerators between the source node and the destination node. Additionally, O-E-O regenerators may be used for recoloring a wavelength in optical networks, where a certain wavelength channel (or wavelength slot) is shifted to a different wavelength. Recently, all optical wavelength shifters have been proposed that change the path constraints for optical path computation as compared to using O-E-O regenerators.

SUMMARY

In one aspect, a control system for spectral slot assignment in flexible grid optical networks is disclosed. The control system may include a processor having access to memory media storing instructions executable by the processor to determine, for an optical path in a flexible grid optical network, a physical source node, a physical destination node, and one or more physical intermediate nodes between the physical source node and the physical destination node, to determine a number of contiguous spectral slots to allocate to traffic transmitted over the optical path, each spectral slot representing a predefined portion of available spectral bandwidth in the flexible grid optical network, to identify, for each pair of neighboring physical nodes in the optical path, one or more candidate combinations of contiguous spectral slots that are available to allocate to traffic transmitted over the optical path, each candidate combination of contiguous spectral slots including the determined number of contiguous spectral slots, and to create an auxiliary graph for the optical path. The auxiliary graph may include, for each candidate combination of contiguous spectral slots, a respective auxiliary fiber link representing the candidate combination of contiguous spectral slots. The auxiliary graph may also include, for each auxiliary fiber link, virtual nodes representing the pair of neighboring physical nodes for which the candidate combination of contiguous spectral slots was identified, the virtual nodes for each auxiliary fiber link including a virtual source-side intermediate node representing a connection to a physical intermediate node on the side of the physical intermediate node toward the physical source node or a virtual destination-side intermediate node representing a connection to a physical intermediate node on the side of the physical intermediate node toward the physical destination node. The auxiliary graph may also include, for each physical intermediate node between the physical source node and the physical destination node, a respective auxiliary transition link between a virtual source-side intermediate node and a virtual destination-side intermediate node for each possible pair of virtual source-side intermediate nodes and virtual destination-side intermediate nodes for the physical intermediate node represented in the auxiliary graph. Each auxiliary transition link may represent either pass-through traffic that is received from a preceding physical node in the optical path and transmitted to a subsequent physical node in the optical path over a same combination of contiguous spectral slots or wavelength shifted traffic that is received from a preceding physical node in the optical path over a given combination of contiguous spectral slots and transmitted to a subsequent physical node in the optical path over a different combination of contiguous spectral slots. The memory media may further instructions executable by the processor to assign a respective transition cost value to each auxiliary transition link, the transition cost value dependent on whether the auxiliary transition link represents pass-through traffic or represents wavelength shifted traffic, and to determine, dependent on the respective transition cost values assigned to the auxiliary transition links, a lowest cost combination of auxiliary links from the virtual source node to the virtual destination node. The lowest cost combination of auxiliary links may include a respective auxiliary fiber link representing a selected candidate combination of contiguous spectral slots between each pair of neighboring physical nodes in the optical path and a respective auxiliary transition link for each physical intermediate node in the optical path. The memory media may further instructions executable by the processor, for each auxiliary fiber link in the lowest cost combination of auxiliary links, to allocate the selected candidate combination of contiguous spectral slots to traffic transmitted over the optical path, and for each auxiliary transition link in the lowest cost combination of auxiliary links representing pass-through traffic, to configure the corresponding physical intermediate node to receive traffic from a preceding physical node in the optical path over a given combination of contiguous spectral slots and transmit the traffic to a subsequent physical node in the optical path over the given combination of contiguous spectral slots.

In any of the disclosed embodiments, each spectral slot may represent a minimum sized portion of available spectral bandwidth in the flexible grid optical network.

In any of the disclosed embodiments, for at least one auxiliary fiber link, the virtual nodes for the auxiliary fiber link may further include a virtual auxiliary source node representing a connection to the physical source node or a virtual auxiliary destination node representing a connection to the physical destination node. The auxiliary graph may further include a virtual source node, a virtual destination node, for each virtual auxiliary source node, a respective auxiliary source link connecting the virtual auxiliary source node and the virtual source node, and for each virtual auxiliary destination node, a respective auxiliary destination link connecting the virtual auxiliary destination node and the virtual destination node. The lowest cost combination of auxiliary links may include a selected auxiliary source link and a selected auxiliary destination link.

In any of the disclosed embodiments, the memory media may further store instructions executable by the processor to assign a respective fiber cost value to each auxiliary fiber link, the fiber cost value being dependent on the candidate combination of contiguous spectral slots for which the auxiliary fiber link was included in the auxiliary graph. Determining the lowest cost combination of auxiliary links may be further dependent on the respective fiber cost values assigned to the auxiliary fiber links.

In any of the disclosed embodiments, the transition cost value assigned to an auxiliary transition link representing pass-through traffic may be lower than the transition cost value assigned to an auxiliary transition link representing wavelength shifted traffic.

In any of the disclosed embodiments, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots may include generating instructions to install or enable a new wavelength shifting component in the given physical intermediate node. The transition cost value assigned to an auxiliary transition link representing traffic that is wavelength shifted using an existing wavelength shifting component in a physical intermediate node may be lower than the transition cost value assigned to the auxiliary transition link representing traffic that is wavelength shifted using the new wavelength shifting component to be installed or enabled in the given physical intermediate node.

In any of the disclosed embodiments, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots may include configuring the given physical intermediate node to perform wavelength shifting for the optical path using an existing wavelength shifting component that shifts traffic from the first combination of contiguous spectral slots to the second combination of contiguous spectral slots. The transition cost value assigned to the auxiliary transition link representing traffic that is wavelength shifted using the existing wavelength shifting component the given physical intermediate node may be lower than the transition cost value assigned to an auxiliary transition link representing traffic that is wavelength shifted using a new wavelength shifting component to be installed or enabled in a physical intermediate node.

In any of the disclosed embodiments, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots may include configuring an optical wavelength shifter of the given physical intermediate node to shift the traffic from the first combination of contiguous spectral slots to the second combination of contiguous spectral slots.

In any of the disclosed embodiments, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots may include configuring an optoelectronic wavelength convertor of the given physical intermediate node to shift the traffic from the first combination of contiguous spectral slots to the second combination of contiguous spectral slots.

In any of the disclosed embodiments, the determined number of contiguous spectral slots to allocate to traffic transmitted over the optical path may include two or more contiguous spectral slots.

In another aspect, a method for spectral slot assignment in flexible grid optical networks is disclosed. The method may include determining, for an optical path in a flexible grid optical network, a physical source node, a physical destination node, and one or more physical intermediate nodes between the physical source node and the physical destination node. The method may also include determining a number of contiguous spectral slots to allocate to traffic transmitted over the optical path, each spectral slot representing a predefined portion of available spectral bandwidth in the flexible grid optical network, identifying, for each pair of neighboring physical nodes in the optical path, one or more candidate combinations of contiguous spectral slots that are available to allocate to traffic transmitted over the optical path, each candidate combination of contiguous spectral slots including the determined number of contiguous spectral slots, and creating an auxiliary graph for the optical path. The auxiliary graph may include, for each candidate combination of contiguous spectral slots, a respective auxiliary fiber link representing the candidate combination of contiguous spectral slots, for each auxiliary fiber link, virtual nodes representing the pair of neighboring physical nodes for which the candidate combination of contiguous spectral slots was identified, the virtual nodes for each auxiliary fiber link including a virtual source-side intermediate node representing a connection to a physical intermediate node on the side of the physical intermediate node toward the physical source node or a virtual destination-side intermediate node representing a connection to a physical intermediate node on the side of the physical intermediate node toward the physical destination node and, for each physical intermediate node between the physical source node and the physical destination node, a respective auxiliary transition link between a virtual source-side intermediate node and a virtual destination-side intermediate node for each possible pair of virtual source-side intermediate nodes and virtual destination-side intermediate nodes for the physical intermediate node represented in the auxiliary graph. Each auxiliary transition link may represent either pass-through traffic that is received from a preceding physical node in the optical path and transmitted to a subsequent physical node in the optical path over a same combination of contiguous spectral slots or wavelength shifted traffic that is received from a preceding physical node in the optical path over a given combination of contiguous spectral slots and transmitted to a subsequent physical node in the optical path over a different combination of contiguous spectral slots. The method may further include assigning a respective transition cost value to each auxiliary transition link, the transition cost value dependent on whether the auxiliary transition link represents pass-through traffic or represents wavelength shifted traffic and determining, dependent on the respective transition cost values assigned to the auxiliary transition links, a lowest cost combination of auxiliary links from the virtual source node to the virtual destination node. The lowest cost combination of auxiliary links may include a respective auxiliary fiber link representing a selected candidate combination of contiguous spectral slots between each pair of neighboring physical nodes in the optical path and a respective auxiliary transition link for each physical intermediate node in the optical path. The method may further include, for each auxiliary fiber link in the lowest cost combination of auxiliary links, allocating the selected candidate combination of contiguous spectral slots to traffic transmitted over the optical path and, for a first auxiliary transition link in the lowest cost combination of auxiliary links representing wavelength shifted traffic, configuring the corresponding physical intermediate node to receive traffic from a preceding physical node in the optical path over a first combination of contiguous spectral slots and transmit the traffic to a subsequent physical node in the optical path over a second combination of contiguous spectral slots.

In any of the disclosed embodiments, the method may further include, for a second auxiliary transition link in the lowest cost combination of auxiliary links representing pass-through traffic, configuring the corresponding physical intermediate node to receive traffic from a preceding physical node in the optical path over a given combination of contiguous spectral slots and transmit the traffic to a subsequent physical node in the optical path over the given combination of contiguous spectral slots.

In any of the disclosed embodiments, for at least one auxiliary fiber link, the virtual nodes for the auxiliary fiber link may further include a virtual auxiliary source node representing a connection to the physical source node or a virtual auxiliary destination node representing a connection to the physical destination node. The auxiliary graph may further include a virtual source node, a virtual destination node, for each virtual auxiliary source node, a respective auxiliary source link connecting the virtual auxiliary source node and the virtual source node and, for each virtual auxiliary destination node, a respective auxiliary destination link connecting the virtual auxiliary destination node and the virtual destination node. The lowest cost combination of auxiliary links may further include a selected auxiliary source link and a selected auxiliary destination link.

In any of the disclosed embodiments, the method may further include assigning a respective fiber cost value to each auxiliary fiber link, the fiber cost value dependent on the candidate combination of contiguous spectral slots for which the auxiliary fiber link was included in the auxiliary graph. Determining the lowest cost combination of auxiliary links may be further dependent on the respective fiber cost values assigned to the auxiliary fiber links.

In any of the disclosed embodiments, the transition cost value assigned to an auxiliary transition link representing pass-through traffic may be lower than the transition cost value assigned to an auxiliary transition link representing wavelength shifted traffic.

In any of the disclosed embodiments, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots may include generating instructions to install or enable a new wavelength shifting component in the given physical intermediate node. The transition cost value assigned to an auxiliary transition link representing traffic that is wavelength shifted using an existing wavelength shifting component in a physical intermediate node may be lower than the transition cost value assigned to the auxiliary transition link representing traffic that is wavelength shifted using the new wavelength shifting component to be installed or enabled in the given physical intermediate node.

In any of the disclosed embodiments, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots may include configuring the given physical intermediate node to perform wavelength shifting for the optical path using an existing wavelength shifting component that shifts traffic from the first combination of contiguous spectral slots to the second combination of contiguous spectral slots. The transition cost value assigned to the auxiliary transition link representing traffic that is wavelength shifted using the existing wavelength shifting component in the given physical intermediate node may be lower than the transition cost value assigned to an auxiliary transition link representing traffic that is wavelength shifted using a new wavelength shifting component to be installed or enabled in a physical intermediate node.

In any of the disclosed embodiments, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots may include configuring an optical wavelength shifter of the given physical intermediate node to shift the traffic from the first combination of contiguous spectral slots to the second combination of contiguous spectral slots.

In any of the disclosed embodiments, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots may include configuring an optoelectronic wavelength convertor of the given physical intermediate node to shift the traffic from the first combination of contiguous spectral slots to the second combination of contiguous spectral slots.

In any of the disclosed embodiments, the determined number of contiguous spectral slots to allocate to traffic transmitted over the optical path may include two or more contiguous spectral slots.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
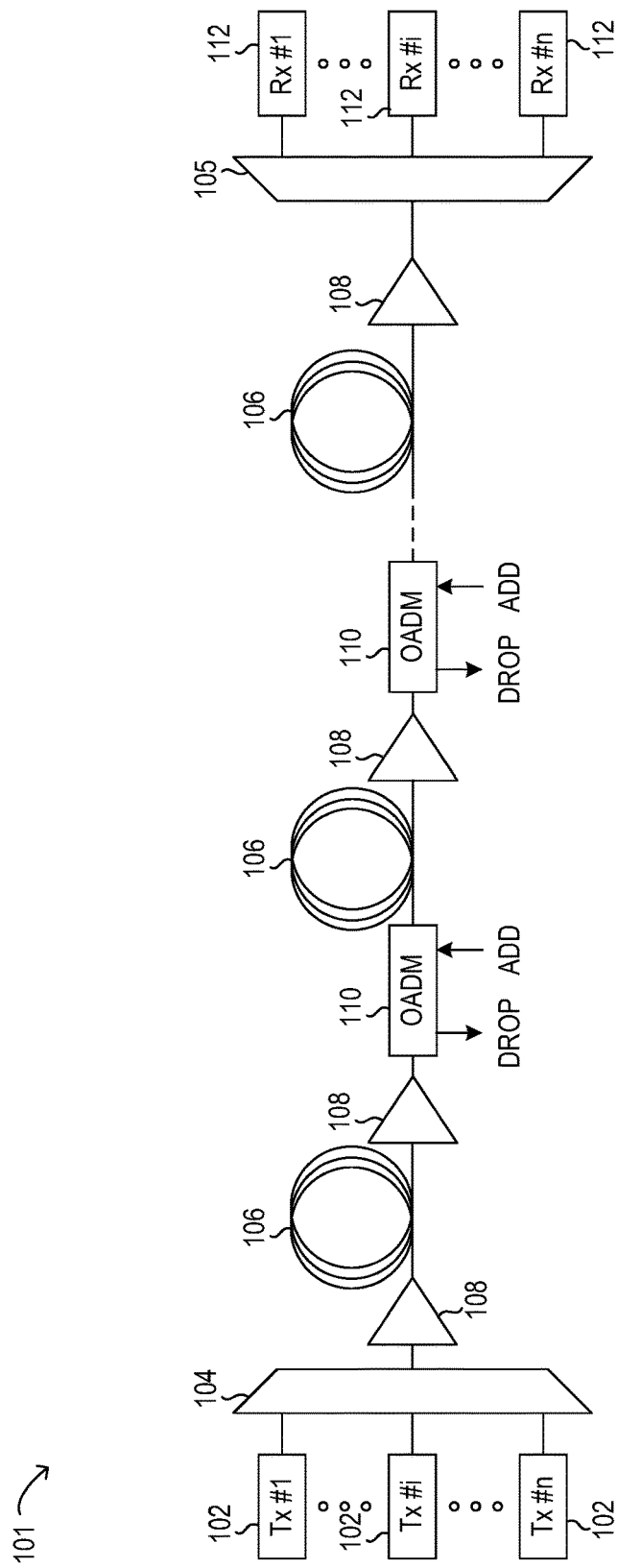
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump (or simply 'pump') to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add or drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, each OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) or a multicast switch (MCS) that may be included in a ROADM (see also FIGS. 4A and 4B).

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (mPSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, or a hierarchical network topology. In operation of optical transport network 101, each of transmitters 102 and receivers 112 may be enabled to implement two or more modulation formats.

A traditional ROADM network typically implements fixed grids with grid bandwidth at 50 GHz and 100 GHz boundaries, as defined by the ITU standard. When using these fixed channels, bandwidth can be wasted if the traffic using one of these channels does not require as much as 50 GHz or 100 GHz spacing. For example, a 40 Gb/s channel for traffic being transmitted using QPSK might not need a 100 GHz channel when transmitting the data over a short distance. In this example, a single channel at 70 GHz spacing might be sufficient. Using two channels of 50 GHz each, as would be required under the ITU standard, 30 GHz of otherwise available spectral bandwidth would be wasted.

In some embodiments of the present disclosure, coherent select technology may be used to tune a flexible grid for a wider range of wavelengths from the C-Band, with the flexibility to use any size grid in the available spectral bandwidth. With coherent select technology, all the wavelengths may be sent in all directions without using active WSS devices that work on a fixed ITU standard grid. Instead, passive devices may be used. In coherent select technology, it is the responsibility of receiver to select the desired wavelength. Achieving this functionality may require a strong layer zero control plan controlling the wavelengths at transmitters and receivers over the entire network span. In some example embodiments, in order to optimize the use of available spectral bandwidth, the entire C-Band may be divided into multiple channels of 6.25 GHz granularity, which is the minimum sized slice of the spectral bandwidth, in this example. Subsequently, depending upon the exact need, the number of these channels to be allocated to traffic between two peers in the optical network may be selected in a manner that avoids wasting bandwidth.

Figure 2A:
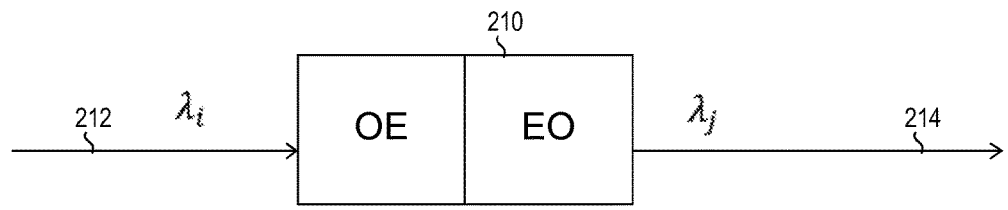
FIG. 2A is a block diagram of selected elements of an embodiment of an optoelectronic wavelength convertor usable in optical networks.

Typically, in an optical mesh network, only about 30% of fiber capacity can be utilized because of spectral fragmentation without network blocking. In some embodiments, the fiber capacity utilization may be increased substantially through the use of recoloring elements, which are operable to shift optical channels to different wavelengths. Because of spectral slot fragmentation, network resource utilization in optical networks may be limited without the use of wavelength shifting. One method of wavelength shifting, which is limited to a single channel, involves the use of an optoelectronic wavelength convertor. FIG. 2A is a block diagram of selected elements of an embodiment of an optoelectronic wavelength convertor usable in optical networks. More specifically, FIG. 2A illustrates an optical-electrical-optical (O-E-O) regenerator 210 that converts a received optical signal to an electrical signal and then converts the electrical signal to an optical signal at a different targeted wavelength. In the illustrated example, O-E-O regenerator 210 is operable to shift an input optical signal 212 on wavelength $\lambda_i$ to an output optical signal 214 on wavelength $\lambda_j$, representing a shift of N wavelength slots, where N=|i−j|. Existing O-E-O based wavelength converters are dependent on the modulation formation of the input optical signal. In addition, the electrical bandwidth supported by existing O-E-O based wavelength converters should be sufficient to support the baud rates of the input optical signals. As the baud rates of the input optical signals increase, the cost of O-E-O based wavelength converters operable to support these higher baud rate input optical signals also increases.

Figure 2B:
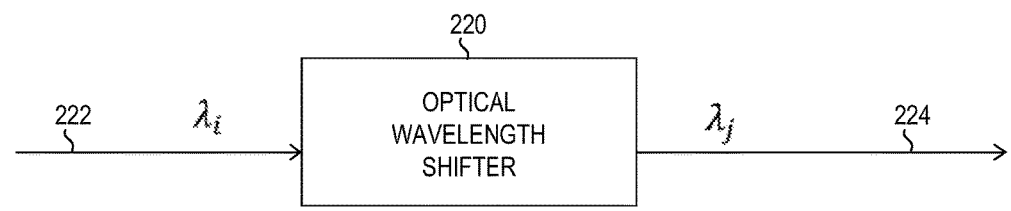
FIGS. 2B and 2C are block diagrams of selected elements of embodiments of an optical wavelength shifter usable in optical networks.
Figure 2C:
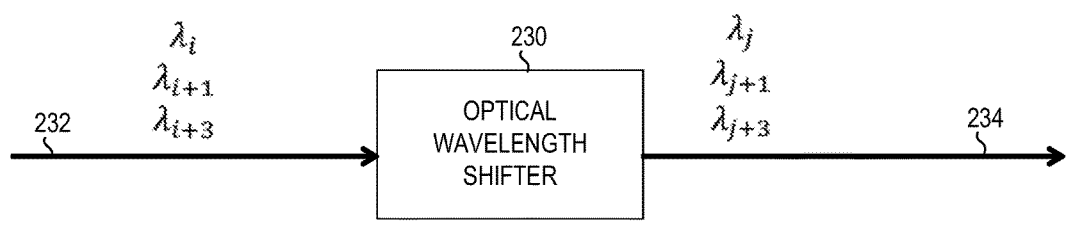

Recently, recoloring using an all-optical process with a low optical signal-to-noise ratio (OSNR) penalty has been described. This process uses a practical polarization diversity all-optical wavelength shifter. Two such all-optical wavelength shifters are shown in FIGS. 2B and 2C. These all-optical wavelength shifters may be associated with lower costs and more operational flexibility than existing O-E-O regenerators. These all-optical wavelength shifters are operable to convert wavelengths based on an optical parametric process that does not depend on the modulation format of the input optical signal and that places no limitations on the baud rate of the input optical signals.

FIGS. 2B and 2C are block diagrams of selected elements of embodiments of an optical wavelength shifter. Specifically, FIG. 2B is a block diagram of selected elements of an all-optical wavelength shifter 220 that supports a single optical channel. Wavelength shifter 220 is shown as an optical element that can be used in optical network 101. Wavelength shifter 220 is correspondingly operable to shift an input optical signal 222 on wavelength $\lambda_i$ to an output optical signal 224 on wavelength $\lambda_j$ representing a shift of N wavelength slots, where N=|i−j|.

Because wavelength shifter 220 works using an all-optical process, wavelength shifter 220 may operate to shift all input wavelength channels a spectral amount equal to N wavelength slots. In other words, an all-optical wavelength shifter may support wavelength conversion of multiple optical channels if the target amount of shift is the same for all of the optical channels. For example, multiple optical channels to be shifted by the same amount may be multiplexed by a wavelength multiplexer or wavelength selective switch (WSS) and presented to wavelength shifter 200 for wavelength shifting. The ability to share an all-optical wavelength shifter among multiple optical channels may reduce the cost to perform wavelength shifting on multiple channels when compared to O-E-O based wavelength conversion, which requires a respective O-E-O wavelength converter for each optical channel regardless of the target amount of shift for each optical channel.

FIG. 2C is a block diagram of selected elements of an embodiment of an optical wavelength shifter 230 that is similar to optical wavelength shifter 220 illustrated in FIG. 2B. In this example, wavelength shifter supports wavelength shifting on multiple channels through wavelength shifter sharing. As shown in FIG. 2C, wavelength shifter 230 may receive input optical signals 232 on wavelengths $\lambda_i$, $\lambda_{i+1}$, and $\lambda_{i+3}$, which are then shifted to generate output optical signals 234 on wavelengths $\lambda_j$, $\lambda_{j+1}$, and $\lambda_{j+3}$, where $\omega_i - \omega_j = \omega_{i+1} - \omega_{j+1} = \omega_{i+3} - \omega_{j+3}$ and where $\omega_X$ is the angular frequency of a corresponding wavelength $\lambda_X$.

As will be described in further detail, methods and systems are disclosed herein for spectral slot assignment and placement of wavelength shifters in flexible grid optical networks. The methods and systems disclosed herein for spectral slot assignment and placement of wavelength shifters in flexible grid optical networks consider the number of spectral slots to be allocated to each optical routing path in the flexible grid optical network. The methods and systems also consider global information for a given optical routing path that has been provisioned, such as available spectral slots for each optical link, available existing wavelength shifters at particular network nodes, and the possibility to install or enable new wavelength shifters at particular network nodes. In particular embodiments, the wavelength shifters may be O-E-O regenerators, such as O-E-O regenerator 210 illustrated in FIG. 2A, or optical wavelength shifters, such as wavelength shifter 220 illustrated in FIG. 2B or wavelength shifter 230 illustrated in FIG. 2C.

The methods and systems disclosed herein for spectral slot assignment and placement of wavelength shifters in optical networks create an auxiliary graph to evaluate spectral slot assignment and recoloring options for a given optical routing path. The auxiliary graph includes virtual nodes and virtual auxiliary nodes to represent actual physical nodes in the optical path (including source nodes, destination nodes, and intermediate nodes), and connections to those physical nodes. The auxiliary graph also includes auxiliary links representing combinations of contiguously available spectral slots with the requested bandwidth for an optical signal in a fiber link between pairs of physical nodes, and auxiliary links representing traffic received at each physical intermediate node from one physical node and transmitted to another physical node (e.g., pass-through traffic or wavelength shifted traffic). To evaluate the auxiliary graph to determine spectral slot assignment and optimal placement of wavelength shifters, a cost value is associated with each auxiliary link in the auxiliary graph. The cost values for certain links may be judiciously selected to implement (or favor) a particular strategy for network resource utilization. Based on the sum of the cost values for different routing paths in the auxiliary graph, an optical path that includes the lowest cost collection of auxiliary links between the source and destination nodes, and corresponding spectral slot assignments, may be determined. The network nodes may then be configured to transmit traffic on the lowest cost collection of auxiliary links in the assigned spectral slots, as indicated by the auxiliary graph. In some cases, this may include configuring a physical intermediate node to use an existing wavelength shifter or to share an existing wavelength shifter. In some cases, this may include generating instructions to install or enable a new wavelength shifter at a particular physical intermediate node.

Figure 3:
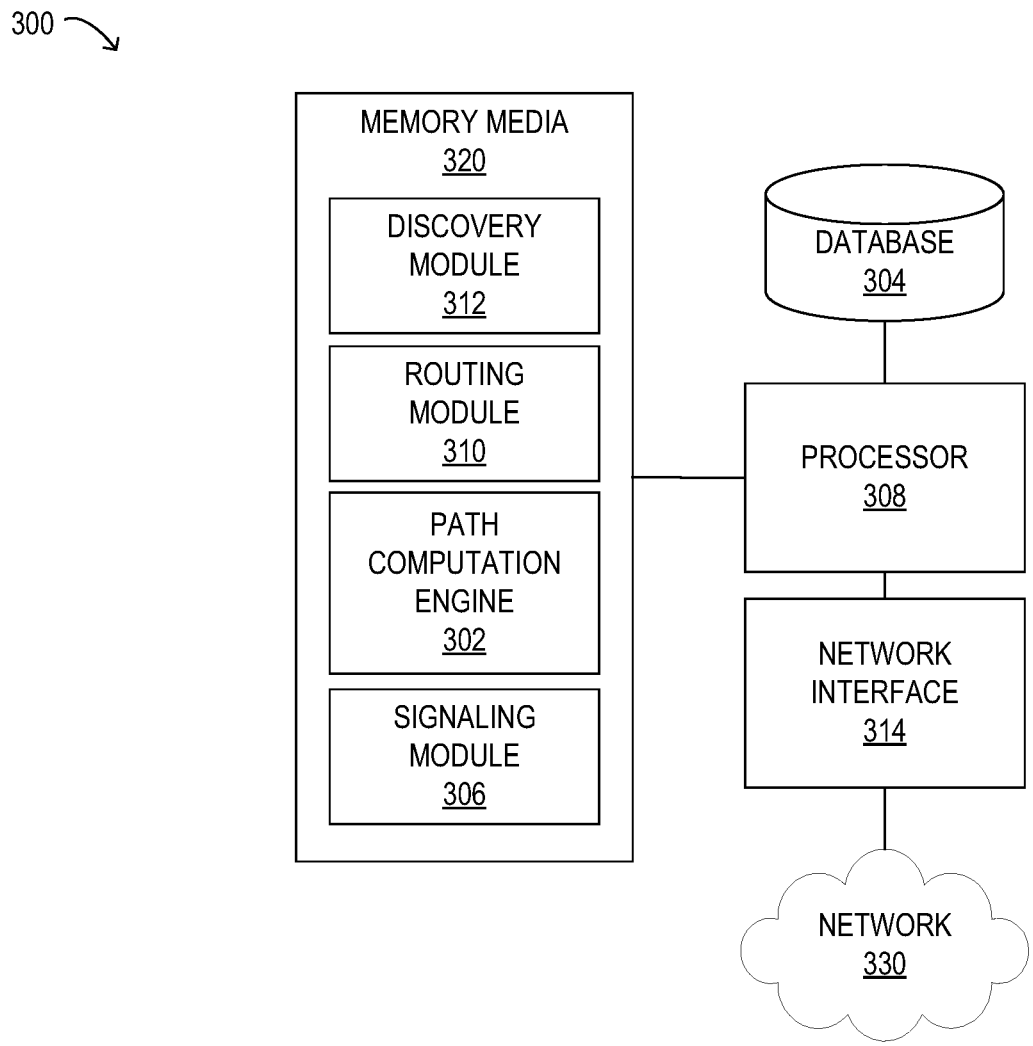
FIG. 3 is a block diagram of selected elements of an embodiment of a control system for an optical network.

Referring now to FIG. 3, a block diagram of selected elements of an embodiment of control system 300 for implementing control plane functionality in optical networks, such as, for example, in optical network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

In FIG. 3, control system 300 includes processor 308 and memory media 320, which may store executable instructions (i.e., executable code) that may be executable by processor 308, which has access to memory media 320. Processor 308 may execute instructions that cause control system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312, and routing module 310. As described herein, path computation engine 302, in conjunction with signaling module 306, discovery module 312, and routing module 310, may represent instructions or code for implementing various algorithms according to the present disclosure.

Also shown included with control system 300 in FIG. 3 is network interface 314, which may be a suitable system, apparatus, or device operable to serve as an interface between processor 308 and network 330. Network interface 314 may enable control system 300 to communicate over network 330 using a suitable transmission protocol or standard. In some embodiments, network interface 314 may be communicatively coupled via network 330 to a network storage resource. In some embodiments, network 330 may be an embodiment of at least certain portions of optical network 101. Network 330 may also include certain portions of a network using galvanic or electronic media. In certain embodiments, network 330 may include at least certain portions of a public network, such as the Internet. Network 330 may be implemented using hardware, software, or various combinations thereof.

In certain embodiments, control system 300 may interface with a person (i.e., a user) and receive data about the optical signal transmission path. For example, control system 300 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 300 may receive data about the optical signal transmission path from a device such as another computing device or a network element, for example via network 330.

In some embodiments, discovery module 312 may receive data concerning an optical signal transmission path in an optical network and may be responsible for discovery of neighbors and links between neighbors. In other words, discovery module 312 may send discovery messages according to a discovery protocol and may receive data about the optical signal transmission path. In some embodiments, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

In FIG. 3, routing module 310 may be responsible for propagating link connectivity information to various nodes within an optical network, such as optical network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304.

In FIG. 3, signaling module 306 may provide functionality associated with setting up, modifying, and tearing down end-to-end networks services in an optical network, such as optical network 101. For example, when an ingress node in the optical network receives a service request, control system 300 may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In operation of control system 300, a feature of optical path computation may include the calculation of end-to-end reachable paths. As noted previously, a directly reachable path may represent a path between a source node and a destination node in an optical network for which an optical signal between the source node and the destination node may be transmitted and received through purely optical components. Such a directly reachable path may stand in contrast, for example, to an indirectly reachable path between the source node and the destination node that involves electrically regenerating the optical signal using O-E-O regenerators, referred to herein as simply 'regenerators', before reaching the destination. An indirectly reachable path may include a plurality of regenerators. Thus, an end-to-end reachable path may include a path from a source node, to a first regenerator node, to at least one second regenerator node, and finally, to a destination node. Path computation engine 302 may find end-to-end reachable paths that integrate a minimum or an otherwise-specified number of regenerators, as well as satisfying other path constraints such as latency and cost.

In some embodiments, path computation engine 302 may further create an auxiliary graph and allow application of different cost metrics to determine the placement of wavelength shifters in optical networks, and the corresponding assignment of optical paths to particular spectral slots, according to desired criterial and network utilization strategies, as disclosed herein.

Figure 4:
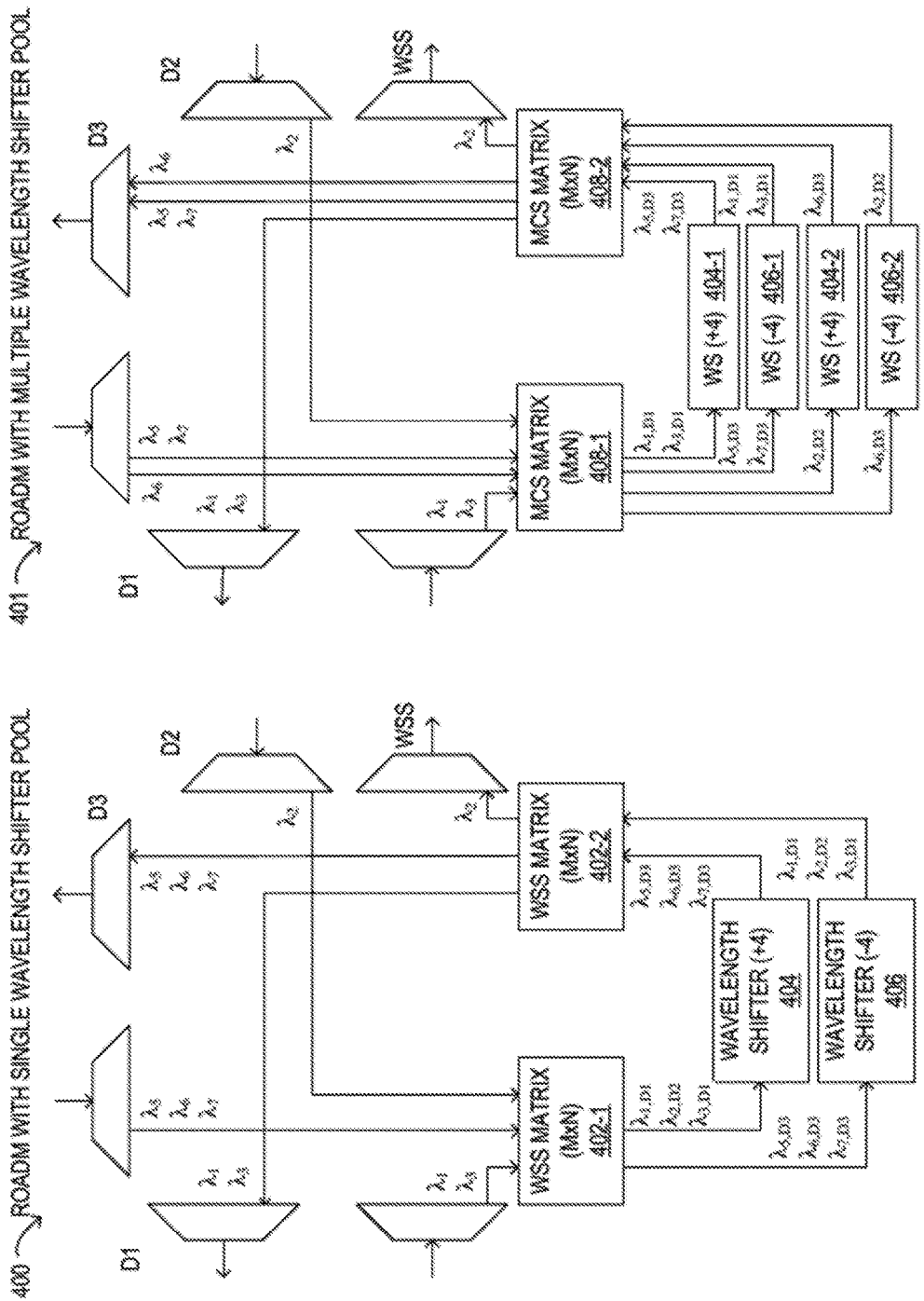
FIGS. 4A and 4B are block diagrams of selected elements of embodiments of ROADM nodes including wavelength shifters.

Referring now to FIGS. 4A and 4B, selected elements of example embodiments of ROADM nodes 400 and 401 are shown, respectively. FIG. 4A illustrates a ROADM node 400 having 3 degrees (D1, D2, D3) and employing WSS matrices 402-1 and 402-2 to enable wavelength shifting from any input degree to any output degree. Accordingly, ROADM node 400 may operate with two wavelength shifters 404 and 406, for performing shifts of N=+4 wavelength slots and N=−4 wavelength slots, respectively. FIG. 4B illustrates a ROADM node 401 having 3 degrees (D1, D2, D3) and employing MCS matrices 408-1 and 408-2 that enable wavelength shifting from any one input degree to any one output degree for a given link. Accordingly, ROADM node 401 may operate with two wavelength upshifters 404-1 and 404-2 for performing shifts of N=+4 wavelength slots and two wavelength downshifters 406-1 and 406-2 for performing shifts of N=−4 wavelength slots.

In practice, the total available spectral bandwidth of an optical network may be divided into many spectral slots, each comprising a minimum sized (e.g., 6.25 GHz) slice of the spectral bandwidth. In one example, the total available spectral bandwidth of an optical network operating in the C-band may be divided into 720 spectral slots, each including a respective 6.25 GHz slice of the spectral bandwidth. It should be noted that the techniques described herein may also be used in optical networks operating in other wavelength bands (e.g., the O-band, E-band, S-band, or L-band). The number of spectral slots into which the total available spectral bandwidth is divided may be dependent on both the minimum sized slice supported in the system and the wavelength band in which the optical network is operating. For example, in an embodiment in which the optical network is operating in the L-band, the number of spectral slots into which the total available spectral bandwidth is divided may be much larger than the number of spectral slots into which the total available spectral bandwidth is divided when operating in the C-band, assuming the same minimum sized slice.

In some embodiments, a fiber link between each pair of physical nodes in the flexible grid optical network may carry traffic on a subset of the available spectral slots in the wavelength band in which the optical network is operating. In the examples that follow, for simplicity, the fiber links between each pair of physical nodes are shown as including fourteen spectral slots, each representing a respective 6.25 GHz slice of the available spectral bandwidth. However, the fiber links between physical nodes in a flexible grid optical network may support different numbers of spectral slots and/or spectral slots of different widths in other embodiments.

Figure 5:
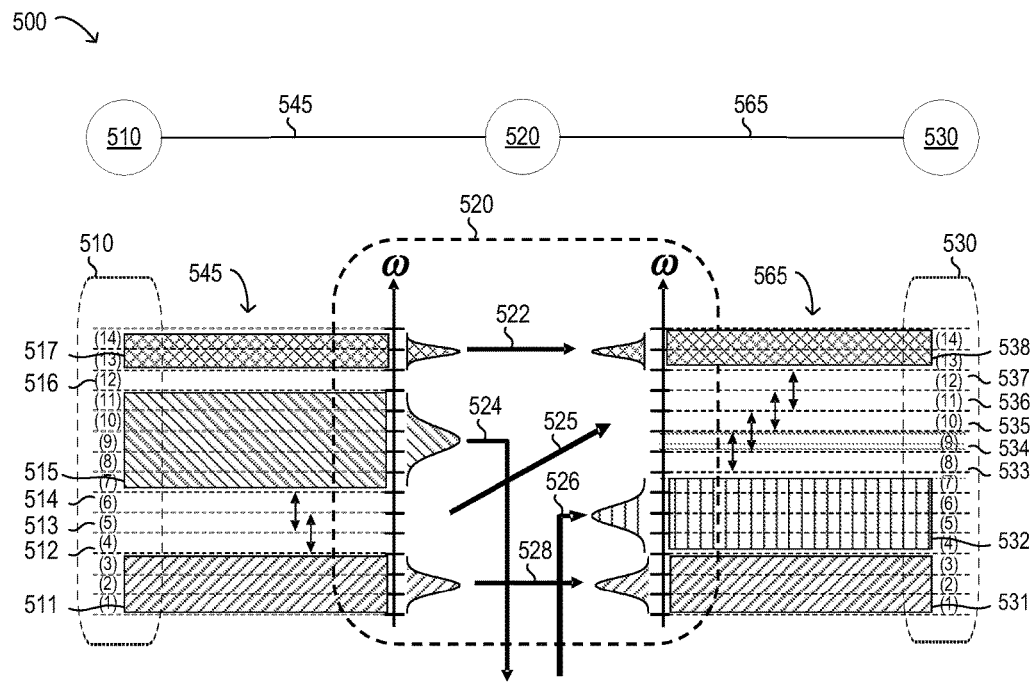
FIG. 5 is a block diagram of selected elements of a flexible grid optical network including three physical nodes to which an optical path is to be added.

FIG. 5 is a block diagram of selected elements of a flexible grid optical network 500 including three physical nodes to which an optical path is to be added. As shown in the simplified schematic in the top portion of FIG. 5, the three physical nodes include physical source node 510, physical destination node 530, and physical intermediate node 520. In this example optical network, the fiber link between physical source node 510 and physical intermediate node 520 is shown as fiber link 540, and the fiber link between physical intermediate node 520 and physical destination node 530 is shown as fiber link 565. The respective spectral slots and traffic channels in each of the fiber links 545 and 565 are shown in more detail in the bottom portion of FIG. 5. In this example, a first channel of existing traffic between physical source node 510 and physical intermediate node 520 (shown as traffic 511) occupies the first three spectral slots, which correspond to spectral slot IDs 1-3, and may be identified by the first one of these spectral slots (spectral slot ID 1). The next three spectral slots (shown as spectral slots 512-514), which correspond to spectral slot IDs 4-6, are empty. A second channel of existing traffic (shown as traffic 515) occupies five spectral slots corresponding to spectral slot IDs 7-11 and may be identified by the first one of these spectral slots (spectral slot ID 7). As indicated by arrow 524, the traffic on this channel (traffic 515) is dropped at physical intermediate node 520. Spectral slot 516, corresponding to spectral slot ID 12, is empty. A third channel of existing traffic (shown as traffic 517) occupies two spectral slots corresponding to spectral slot IDs 13-14 and may be identified by the first one of these spectral slots (spectral slot ID 13).

In the illustrated example, a first channel of existing traffic between physical intermediate node 520 and physical destination node 530 (shown as traffic 531) occupies the first three spectral slots, which correspond to spectral slot IDs 1-3, and may be identified by the first one of these spectral slots (spectral slot ID 1). As shown by arrow 528, this traffic is pass-through traffic corresponding to the traffic 511 between physical source node 510 and physical intermediate node 520. A second channel of existing traffic (shown as traffic 532) occupies four spectral slots, corresponding to spectral slot IDs 4-7, and may be identified by the first one of these spectral slots (spectral slot ID 4). As indicted by arrow 526, the traffic on this channel (traffic 532) is added at physical intermediate node 520. The next five spectral slots (shown as spectral slots 533-537), which correspond to spectral slot IDs 8-12, are empty. A third channel of existing traffic (shown as traffic 538) occupies two spectral slots corresponding to spectral slot IDs 13-14 and may be identified by the first one of these spectral slots (spectral slot ID 13). As indicated by arrow 522, this traffic is pass-through traffic corresponding to traffic 517 between physical source node 510 and physical intermediate node 520.

The methods and systems disclosed herein may consider global information when determining spectral slot assignments and placement of wavelength shifters in flexible grid optical networks. For example, in various embodiments, these methods and systems may considered any or all of the following information: the required number of optical spectral slots for an optical signal, the available spectral slots in each link for a given optical routing path (for example, for the shortest optical path), the availability of existing wavelengths shifters installed at particular physical intermediate nodes (whether available for a new optical signal or for sharing among two or more optical signals that are wavelength shifted by the same amount), the possibility to install or enable new wavelength shifters at particular physical intermediate nodes (where the maximum number of wavelength shifters may be limited at certain nodes due to space limitations), and/or the particular architecture for a wavelength shifter pool (which may add constrains at particular ROADM nodes).

In at least some embodiments of the systems and method described herein, an auxiliary graph representing the flexible grid optical network may be created to evaluate spectral slot assignment and recoloring options for a given optical routing path to be added to the optical network based on some or all of the global information listed above. The auxiliary graph may include virtual nodes and virtual auxiliary nodes that represent actual physical nodes in the optical path (including source nodes, destination nodes, and intermediate nodes), and connections to those physical nodes. The auxiliary graph may also include auxiliary links representing combinations of contiguously available spectral slots with the requested bandwidth for an optical signal in a fiber link between pairs of physical nodes, and auxiliary links representing traffic received at each physical intermediate node from one physical node and transmitted to another physical node (e.g., pass-through traffic or wavelength shifted traffic). For example, in an auxiliary graph for a flexible grid optical network, rather than including an auxiliary link for each individual available spectral slot (some of which may represent links that cannot support an optical signal with a bandwidth requirement larger than one spectral slot) or for each group of contiguous spectral slots (some of which may be wider than the bandwidth required for a particular optical signal), auxiliary links may be created that each represent a respective combination of contiguously available spectral slots with the bandwidth required for a particular optical signal.

An auxiliary graph may be created to determine wavelength shifter placement and spectral slot assignments for a given optical path to be added in the flexible grid optical network 500 illustrated in FIG. 5. In this example, the optical path is shown in a linear topology from physical source node 510 to physical intermediate node 520 to physical destination node 530, and the new wavelength to be added requires two spectral slots. Creating the auxiliary graph may include performing some or all of the following operations:

1. Determine a routing path for the new optical path. The routing path may be given (e.g., in a request to provision the optical path) or calculated (e.g., by determining the shortest path from the physical source node to the physical destination node in the flexible grid optical network through one or more physical intermediate nodes), in different embodiments.
2. Determine the required number of spectral slots for the new optical path. In various embodiments, the required number of spectral slots may be given (e.g., in a request to add the optical path) or may be calculated based on the bandwidth required for the new optical path and the width of the spectral slots in the flexible grid optical network.
3. For each fiber link between the pairs of physical nodes, identify all possible combinations of contiguous available spectral slots that meet the wavelength requirement.
4. Add auxiliary fiber links to the auxiliary graph, each of which represents one of the possible combinations of contiguous spectral slots that meet the wavelength requirement and add virtual nodes at each end of each of the fiber links. In some embodiments, each auxiliary fiber link may be associated with (and identified by) the lowest slot ID value of the available spectral slots in the corresponding combination of spectral slots.
5. Add auxiliary transition links between added virtual nodes in the auxiliary graph, some of which represent wavelength shifted traffic (when the spectral slot IDs for the traffic change from the source side of a physical intermediate node to the destination side), and some of which represent pass-through traffic (when the spectral slot IDs for the traffic do not change from the source side of a physical intermediate node to the destination side).

6. Add virtual source and destination nodes in the auxiliary graph and add auxiliary links to the virtual source and destination nodes in the auxiliary graph.
7. Assign a respective cost to each auxiliary link in the auxiliary graph based on a particular strategy for optimizing network resource utilization when determining wavelength shifter placements and spectral slot assignments. In one example, auxiliary links representing spectral slots may be assigned cost values that are proportional to their associated slot ID values to implement a "first fit" spectral slot assignment strategy. In another example, to reduce the number of wavelength shifters needed for the new optical path, the cost values assigned to auxiliary links representing wavelength shifted traffic may be much higher than the cost values assigned to auxiliary links representing pass-through traffic.

Once an auxiliary graph has been created, the minimum cost path for the new optical path may be determined by identifying the collection of auxiliary links between the source and destination nodes for which the sum of the assigned cost values is lowest. Along the identified minimum cost path, each of the auxiliary fiber links represents a selected candidate combination of contiguous spectral slots to be assigned to the new optical path in a respective fiber link between a pair of neighboring physical nodes in the optical path, and each of the auxiliary transition links represents pass-through traffic or wavelength shifted traffic at a respective physical intermediate node in the optical path. This information may then be used to configure the physical nodes in the optical path to implement the determined solution, as described herein.

In the example flexible grid optical network 500 illustrated in FIG. 5, to add an optical channel that occupies two spectral slots, a combination of two contiguous spectral slots that are empty must be identified between physical source node 510 and physical intermediate node 520. Two candidate combinations, one including spectral slots 512-513 (corresponding to slot IDs 4-5) and the other including spectral slots 513-514 (corresponding to slot IDs 5-6), are available between physical source node 510 and physical intermediate node 520. In addition, a combination of two contiguous spectral slots that are empty must be identified between physical intermediate node 520 and physical destination node 530. Four candidate combinations are available, the first including spectral slots 533-534 (corresponding to slots IDs 8-9), the second including spectral slots 534-535 (corresponding to slots IDs 9-10), the third including spectral slots 535-536 (corresponding to slots IDs 10-11), and the fourth including spectral slots 536-537 (corresponding to slots IDs 11-12). In this example, since there are no combinations of contiguous spectral slots with the same slot IDs on both the source and destination sides of physical intermediate node 520 that are empty, adding the optical channel would require wavelength shifting in physical intermediate node 520, as shown by arrow 525.

Figure 6:
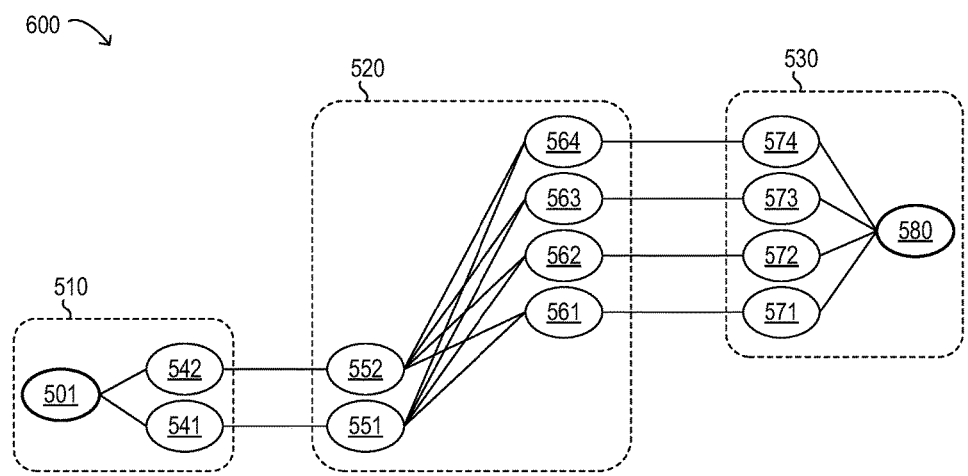
FIG. 6 is a block diagram of selected elements of an embodiment of an auxiliary graph for spectral slot assignment and wavelength shifter placement in the flexible grid optical network illustrated in FIG. 5.

FIG. 6 is a block diagram of selected elements of an embodiment of auxiliary graph 600 for spectral slot assignment and wavelength shifter placement in flexible grid optical network 500 illustrated in FIG. 5. It is noted that auxiliary graph 600 is shown in simplified form for descriptive clarity, and that the generation and use of auxiliary graph 600 in different embodiments may be applied to networks and optical paths of varying complexity, including very large and complex optical paths with large numbers of nodes and wavelength channels. In the illustrated example, auxiliary graph 600 represents elements of and between physical source node 510, physical destination node 530, and physical intermediate node 520 shown in FIG. 5. For example, auxiliary graph 600 includes virtual source node 501 representing physical source node 510, virtual auxiliary source nodes 541, 542, each representing a connection to physical source node 510, virtual destination node 580 representing physical destination node 530, and virtual auxiliary destination nodes 571-574, each representing a connection to physical destination node 530. In the illustrated example, auxiliary graph 600 also includes virtual source-side intermediate nodes 551-552, each representing a connection to physical intermediate node 520 on the side of physical intermediate node 520 toward physical source node 510, and virtual destination-side intermediate nodes 561-564, each representing a connection to physical intermediate node 520 on the side of physical intermediate node 520 toward physical destination node 530.

Auxiliary graph 600 includes two auxiliary fiber links between physical source node 510 and physical intermediate node 520, each representing a candidate combination of spectral slots for an optical link between physical source node 510 and physical intermediate node 520. More specifically, auxiliary graph 600 includes one auxiliary fiber link between virtual auxiliary source node 541 and virtual source-side intermediate node 551 associated with spectral slot ID 4 that includes spectral slots 512 (corresponding to spectral slot ID 4) and 513 (corresponding to spectral slot ID 5). Auxiliary graph 600 includes another auxiliary fiber link between virtual auxiliary source node 542 and virtual source-side intermediate node 552 associated with slot ID 5 that includes spectral slots 513 (corresponding to spectral slot ID 5) and 514 (corresponding to spectral slot ID 6).

Auxiliary graph 600 includes four auxiliary fiber links between physical intermediate node 520 and physical destination node 530, each representing a candidate combination of spectral slots for an optical link between physical intermediate node 520 and physical destination node 530. Specifically, auxiliary graph 600 includes one auxiliary fiber link between virtual destination-side intermediate node 561 and virtual auxiliary destination node 571 associated with slot ID 8 that includes spectral slots 533 (corresponding to spectral slot ID 8) and 534 (corresponding to spectral slot ID 9); one auxiliary fiber link between virtual destination-side intermediate node 562 and virtual auxiliary destination node 572 associated with slot ID 9 that includes spectral slots 534 (corresponding to spectral slot ID 9) and 535 (corresponding to spectral slot ID 10); one auxiliary fiber link between virtual destination-side intermediate node 563 and virtual auxiliary destination node 573 associated with slot ID 10 that includes spectral slots 535 (corresponding to spectral slot ID 10) and 536 (corresponding to spectral slot ID 11); and one auxiliary fiber link between virtual destination-side intermediate node 564 and virtual auxiliary destination node 574 associated with slot ID 11 that includes spectral slots 536 (corresponding to spectral slot ID 11) and 537 (corresponding to spectral slot ID 12).

Auxiliary graph 600 also includes eight auxiliary transition links representing all possible transition links between pairs of virtual source-side intermediate nodes 551-552 and virtual destination-side intermediate nodes 561-563 for physical intermediate node 520. In this example, none of these auxiliary transition links represents pass-through traffic. Instead, each of the auxiliary transition links represents wavelength shifted traffic. Therefore, all possible optical paths would require the use of a wavelength shifter at physical intermediate node 520, in this example. The wavelength shifter may be an existing wavelength shifter that is installed in physical intermediate node 520 (and that might or might not already be enabled to perform wavelength shifting by a particular amount) or may be a new wavelength shifter to be installed in physical intermediate node 520. For example, in some embodiments, a wavelength shifter may be installed in physical intermediate node 520 and already serving existing traffic for wavelength shifting of a given amount, and the traffic to be carried on the new optical path may be assigned to this working wavelength shifter for sharing if the wavelength of the new optical path does not conflict with the existing traffic and the amount of the wavelength shift for the new optical path is same as the amount of the wavelength shift being applied to the existing traffic. In this case, instructions or a control signal may be sent to physical intermediate node 520 to assign the traffic on the new optical path to the working wavelength shifter for sharing. In other embodiments, a wavelength shifter may be installed in physical intermediate node 520 but might not yet be enabled to serve traffic for wavelength shifting. In this case, instructions or a control signal may be sent to physical intermediate node 520 to configure (or enable) the wavelength shifter as a new wavelength shifter to serve the traffic on the new optical path for wavelength shifting of the required amount. In still other embodiments, there may be no existing wavelength shifter available to assign to the traffic on the new optical path. In this case, instructions may be generated indicating that a new wavelength shifter should be installed in physical intermediate node 520 and configured (or enabled) as a new wavelength shifter to serve the traffic on the new optical path for wavelength shifting of the required amount.

To evaluate an auxiliary graph to determine spectral slot assignment and optimal placement of wavelength shifters, a cost value may be associated with each auxiliary link in the auxiliary graph. The cost values for certain links may be judiciously selected to implement (or favor) a particular strategy for optimizing network resource utilization. In some embodiments, the fiber cost values assigned to auxiliary fiber links may be dependent on the candidate combination of contiguous spectral slots for which the auxiliary fiber link was included in the auxiliary graph. For example, the fiber cost value may be dependent on the spectral slot ID associated with the candidate combination of contiguous spectral slots such that candidate combination of contiguous spectral slots associated with lower spectral slot ID values are assigned lower fiber cost values than candidate combination of contiguous spectral slots associated with higher spectral slot ID values. In some embodiments, the transition cost values assigned to auxiliary transition links representing pass-through traffic may be lower than the transition cost values assigned to auxiliary transition links representing wavelength shifted traffic. In some embodiments, the transition cost values assigned to auxiliary transition links representing traffic that is wavelength shifted using an existing wavelength shifting component in a physical intermediate node may be lower than the transition cost values assigned to auxiliary transition links representing traffic that is wavelength shifted using a new wavelength shifting component to be installed or enabled in a physical intermediate node.

Based on the sum of the cost values assigned to the auxiliary links for each possible routing path in the auxiliary graph, an optical path from source node 510 to destination node 530 that includes the lowest cost collection of auxiliary links between the source and destination nodes, and corresponding spectral slot assignments for the optical path, may be determined. In at least some embodiments, the lowest cost path search may be unidirectional (e.g., from left to right with respect to the auxiliary graph), this avoiding the possibility of a loop at physical intermediate node 520 based on the respective cost values assigned to the auxiliary links. The network nodes may then be configured to transmit traffic on the lowest cost collection of auxiliary links in the assigned spectral slots, as indicated by the auxiliary graph. In some cases, this may include configuring a physical intermediate node to use an existing wavelength shifter or to share an existing wavelength shifter. In some cases, this may include generating instructions to install or enable a new wavelength shifter at a particular physical intermediate node.

In the example illustrated in FIGS. 5 and 6, the lowest cost path for the optical signal may include an existing wavelength shifter (if available in physical intermediate node 520) rather than a new wavelength shifter that would need to be installed in physical intermediate node 520 as a result of the analysis of auxiliary graph 600. In some embodiments, the selection of one of the candidate combinations of spectral slots on the source side of physical intermediate node 520 and one of the candidate combinations of spectral slots on the destination side of physical intermediate node 520 for the optical path may be dependent on respective cost values assigned to each of the auxiliary fiber links in the auxiliary graph. For example, the auxiliary fiber links representing candidate combinations associated with the lowest spectral slot ID values on each side of physical intermediate node 520 may be assigned lower cost values than the auxiliary fiber links representing candidate combinations associated with higher spectral slot ID values.

Figure 7:
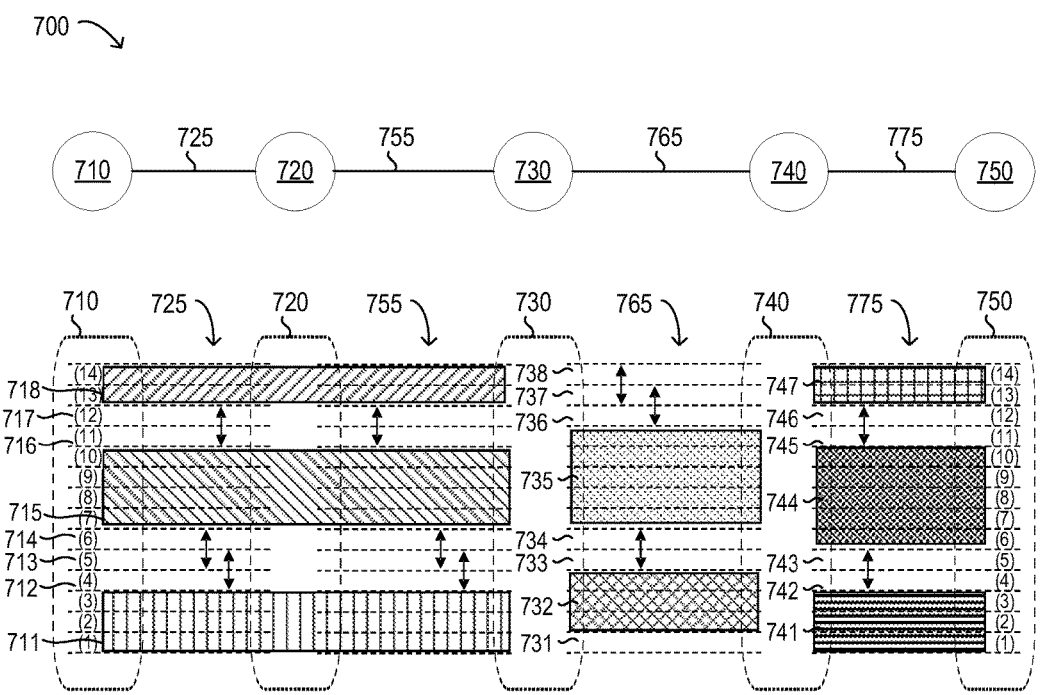
FIG. 7 is a block diagram of selected elements of a flexible grid optical network including five physical nodes to which an optical path is to be added.

FIG. 7 is a block diagram of selected elements of a flexible grid optical network 700 including five physical nodes to which an optical path is to be added. As in the previous example, for simplicity, the fiber links between each pair of physical nodes are shown as including fourteen spectral slots, each representing a respective 6.25 GHz slice of the available spectral bandwidth. As shown in the simplified schematic in the top portion of FIG. 7, the five physical nodes include physical source node 710, physical destination node 750, and physical intermediate nodes 720, 730, and 740. In this example optical network, the fiber link between physical source node 710 and physical intermediate node 720 is shown as fiber link 725, the fiber link between physical intermediate node 720 and physical intermediate node 730 is shown as fiber link 755, the fiber link between physical intermediate node 730 and physical intermediate node 740 is shown as fiber link 765, and the fiber link between physical intermediate node 740 and physical destination node 750 is shown as fiber link 775. The respective spectral slots and traffic channels in each of the fiber links 725, 755, 765, and 775 are shown in more detail in the bottom portion of FIG. 7.

In this example, a first channel of existing traffic between physical source node 710 and physical intermediate node 720 (shown as traffic 711) occupies the first three spectral slots, which correspond to spectral slot IDs 1-3, and may be identified by the first one of these spectral slots (spectral slot ID 1). The next three spectral slots (shown as spectral slots 712-714), which correspond to spectral slot IDs 4-6, are empty. A second channel of existing traffic between physical source node 710 and physical intermediate node 720 (shown as traffic 715) occupies four spectral slots corresponding to spectral slot IDs 7-10 and may be identified by the first one of these spectral slots (spectral slot ID 7). Spectral slots 716 and 717, corresponding to spectral slot IDs 11 and 12, are empty. A third channel of existing traffic between physical source node 710 and physical intermediate node 720 (shown as traffic 718) occupies two spectral slots, corresponding to spectral slot IDs 13-14 and may be identified by the first one of these spectral slots (spectral slot ID 13).

In the illustrated example, all of the existing traffic shown between physical source node 710 and physical intermediate node 720 is pass-through traffic, which is received by physical intermediate node 720 and transmitted to physical intermediate node 730 over the same combinations of spectral slots. At physical intermediate node 730, the traffic on all three existing channels (shown as traffic 711, traffic 715 and traffic 718) is dropped, and new traffic between physical intermediate node 730 and physical intermediate node 740 is added on two channels. Specifically, new traffic 732, which occupies three spectral slots (corresponding to spectral slot IDs 2-4) and new traffic 735, which occupies five spectral slots (corresponding to spectral slot IDs 7-11) are added at physical intermediate node 530. The remaining spectral slots, 731 (corresponding to spectral slot ID 1), 733-734 (corresponding to spectral slot IDs 5-6), and 736-738 (corresponding to spectral slot IDs 12-14) are empty.

At physical intermediate node 740, the traffic on both existing channels (shown as traffic 732 and traffic 735) is dropped, and new traffic between physical intermediate node 740 and physical destination node 750 is added on three channels. Specifically, new traffic 741, which occupies three spectral slots (corresponding to spectral slot IDs 1-3), new traffic 744, which occupies five spectral slots (corresponding to spectral slot IDs 6-10), and new traffic 747, which occupies two spectral slots (corresponding to spectral slot IDs 13-14) and added at physical intermediate node 540. The remaining spectral slots, 742-743 (corresponding to spectral slot IDs 4-5), and 745-746 (corresponding to spectral slot IDs 11-12) are empty.

An auxiliary graph may be created to determine wavelength shifter placement and spectral slot assignments for a given optical path to be added in the flexible grid optical network 700 illustrated in FIG. 7. In this example, the optical path is shown in a linear topology from physical source node 710 to physical intermediate node 720 to physical intermediate node 730 to physical intermediate node 740 and finally to physical destination node 750, and the new wavelength to be added requires two spectral slots. In this example, creating the auxiliary graph may include performing some or all of the operations listed above in reference to the creation of auxiliary graph 600 illustrated in FIG. 6.

Figure 8A:
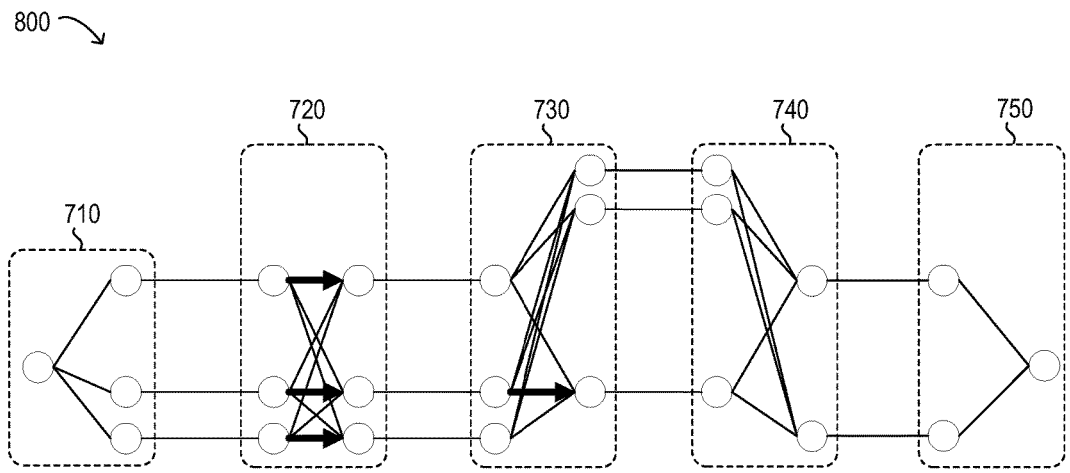
FIG. 8A is a block diagram of selected elements of an embodiment of an auxiliary graph for spectral slot assignment and wavelength shifter placement in the flexible grid optical network illustrated in FIG. 7.

FIG. 8A is a block diagram of selected elements of an embodiment of auxiliary graph 800 for spectral slot assignment and wavelength shifter placement in flexible grid optical network 700 illustrated in FIG. 7. It is noted that auxiliary graph 800 is shown in simplified form for descriptive clarity, and that the generation and use of auxiliary graph 800 in different embodiments may be applied to networks and optical paths of varying complexity, including very large and complex optical paths with large numbers of nodes and wavelength channels.

In the illustrated example, auxiliary graph 800 represents elements of and between physical source node 710, physical intermediate nodes 720-740, and physical destination node 750, as shown in FIG. 7. For example, auxiliary graph 800 includes a virtual source node representing physical source node 710, three virtual auxiliary source nodes, each representing a connection to physical source node 710, a virtual destination node representing physical destination node 750, and two virtual auxiliary destination nodes, each representing a connection to physical destination node 750.

Auxiliary graph 800 includes, for physical intermediate node 720, three virtual source-side intermediate nodes, each representing a connection to physical intermediate node 720 on the side of physical intermediate node 720 toward physical source node 710 and three virtual destination-side intermediate nodes, each representing a connection to physical intermediate node 720 on the side of physical intermediate node 720 toward physical destination node 750. Auxiliary graph 800 includes, for physical intermediate node 730, three virtual source-side intermediate nodes, each representing a connection to physical intermediate node 730 on the side of physical intermediate node 730 toward physical source node 710 and three virtual destination-side intermediate nodes, each representing a connection to physical intermediate node 730 on the side of physical intermediate node 730 toward physical destination node 750. Auxiliary graph 800 includes, for physical intermediate node 740, three virtual source-side intermediate nodes, each representing a connection to physical intermediate node 740 on the side of physical intermediate node 740 toward physical source node 710 and two virtual destination-side intermediate nodes, each representing a connection to physical intermediate node 740 on the side of physical intermediate node 740 toward physical destination node 750.

As illustrated in FIG. 8A, auxiliary graph 800 includes three auxiliary fiber links between physical source node 710 and physical intermediate node 720, each representing a candidate combination of spectral slots for an optical path between physical source node 710 and physical intermediate node 720. One of these auxiliary fiber link represents spectral slots 712-713, corresponding to spectral slot IDs 4-5, one of these auxiliary fiber link represents spectral slots 713-714, corresponding to spectral slot IDs 5-6, and one of these auxiliary fiber link represents spectral slots 716-717, corresponding to spectral slot IDs 11-12. Auxiliary graph 800 also includes three auxiliary fiber links between physical intermediate node 720 and physical intermediate node 730, each representing a candidate combination of spectral slots for an optical path between physical intermediate node 720 and physical intermediate node 730. One of these auxiliary fiber link represents spectral slots 712-713, corresponding to spectral slot IDs 4-5, one of these auxiliary fiber link represents spectral slots 713-714, corresponding to spectral slot IDs 5-6, and one of these auxiliary fiber link represents spectral slots 716-717, corresponding to spectral slot IDs 11-12. Auxiliary graph 800 also includes three auxiliary fiber links between physical intermediate node 730 and physical intermediate node 740, each representing a candidate combination of spectral slots for an optical path between physical intermediate node 730 and physical intermediate node 740. One of these auxiliary fiber link represents spectral slots 733-734, corresponding to spectral slot IDs 5-6, one of these auxiliary fiber link represents spectral slots 736-737, corresponding to spectral slot IDs 12-13, and one of these auxiliary fiber link represents spectral slots 737-738, corresponding to spectral slot IDs 13-14. Auxiliary graph 800 includes two auxiliary fiber links between physical intermediate node 740 and physical destination node 750, each representing a candidate combination of spectral slots for an optical path between physical intermediate node 740 and physical destination node 750. One of these auxiliary fiber link represents spectral slots 742-743, corresponding to spectral slot IDs 4-5, and one of these auxiliary fiber link represents spectral slots 745-746, corresponding to spectral slot IDs 11-12.

As illustrated in FIG. 8A, auxiliary graph 800 includes, for physical intermediate node 720, auxiliary transition links representing nine possible transition links between pairs of virtual source-side intermediate nodes and virtual destination-side intermediate nodes. Three of the auxiliary transition links (shown in bold) represent pass-through traffic, while six others represent traffic that is wavelength shifted using an existing or newly installed (or enabled) wavelength shifter. Auxiliary graph 800 also includes, for physical intermediate node 730, auxiliary transition links representing nine possible transition links between pairs of virtual source-side intermediate nodes and virtual destination-side intermediate nodes. One of the auxiliary transition links (shown in bold) represents pass-through traffic, while eight others represent traffic that is wavelength shifted using an existing or newly installed (or enabled) wavelength shifter. Auxiliary graph 800 includes, for physical intermediate node 740, auxiliary transition links representing six possible transition links between pairs of virtual source-side intermediate nodes and virtual destination-side intermediate nodes. All of these auxiliary transition links represent traffic that is wavelength shifted using an existing or newly installed (or enabled) wavelength shifter.

Once auxiliary graph 800 has been created, the minimum cost path for the new optical channel may be determined by identifying the collection of auxiliary links between physical source node 710 and physical destination node 750 (including the cumulative costs of all auxiliary fiber links and all auxiliary transition links) for which the sum of the assigned cost values is lowest. Along the identified minimum cost path, each of the auxiliary fiber links represents a selected candidate combination of contiguous spectral slots to be assigned to the new optical channel in a respective fiber link between a pair of neighboring physical nodes in the optical path, and each of the auxiliary transition links represents pass-through traffic or wavelength shifted traffic at a respective physical intermediate node in the optical path.

Figure 8B:
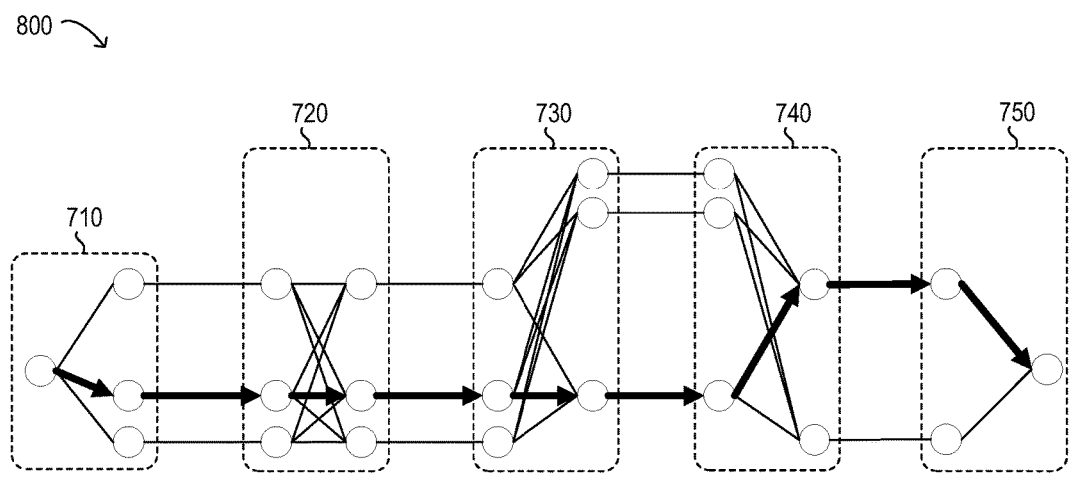
FIG. 8B is a block diagram of selected elements of an auxiliary graph indicating a lowest cost solution for adding an optical path to a flexible grid optical network.

FIG. 8B is a block diagram of selected elements of an auxiliary graph 800 indicating a lowest cost solution for adding an optical path requiring two spectral slots to flexible grid optical network 700 illustrated in FIG. 7. In auxiliary graph 800, the lowest cost combination of auxiliary links is shown with bold arrows. In this example, the auxiliary fiber links in the lowest cost combination of auxiliary links include an auxiliary fiber link between physical source node 710 and physical intermediate node 720 representing spectral slots 713-714 (which correspond to spectral slot IDs 5-6), an auxiliary fiber link between physical intermediate node 720 and physical intermediate node 730 representing spectral slots 713-714 (which correspond to spectral slot IDs 5-6), an auxiliary fiber link between physical intermediate node 730 and physical intermediate node 740 representing spectral slots 733-734 (which correspond to spectral slot IDs 5-6), and an auxiliary fiber link between physical intermediate node 740 and physical destination node 750 representing spectral slots 745-746 (which correspond to spectral slot IDs 11-12).

In this example, two of the auxiliary transition links in the lowest cost combination of auxiliary links represent pass-through traffic. These include an auxiliary transition link for spectral slot IDs 5-6 at physical intermediate node 720 and at physical intermediate node 730. One of the auxiliary transition links in the lowest cost combination of auxiliary links represents wavelength shifted traffic. Specifically, the optical path corresponding to the lowest cost combination of auxiliary links requires a wavelength shifter at node 740 corresponding to the auxiliary transition link from spectral slots 733-734 (corresponding to spectral slot IDs 5-6) and spectral slots 745-746 (corresponding to spectral slot IDs 11-12). In this example, in response to the determination of the lowest cost combination of auxiliary links, instructions may be generated and/or sent to the physical nodes of the flexible grid optical network on the optical path to configure them to transmit and receive traffic on a new optical path over the lowest cost collection of auxiliary links in the assigned spectral slots, as indicated by the auxiliary graph. In some cases, this may include configuring a physical intermediate node to use an existing wavelength shifter or to share an existing wavelength shifter. In some cases, this may include generating instructions to install or enable a new wavelength shifter at a particular physical intermediate node.

Figure 9:
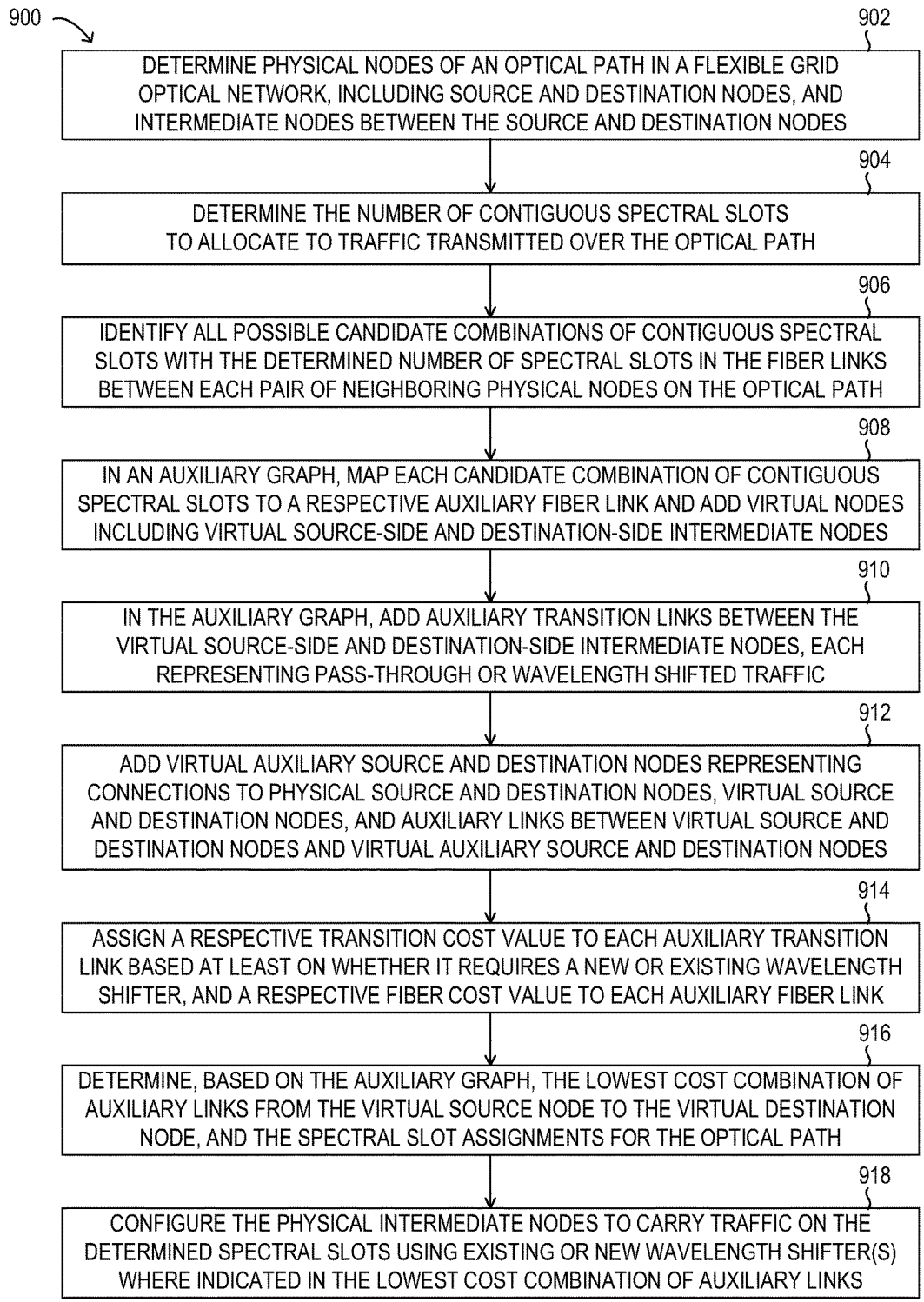
FIG. 9 is a flow chart of selected elements of a method for spectral slot assignment and placement of wavelength shifters in flexible grid optical networks.

Referring now to FIG. 9, a block diagram of selected elements of an embodiment of a method 900 for spectral slot assignment and placement of wavelength shifters in flexible grid optical networks, as described herein, is depicted in flowchart form. In some embodiments, some or all of the operations of method 900 depicted in FIG. 9 may be performed using a path computation engine, such as path computation engine 302 in FIG. 3. In other embodiments, one or more of the operations of method 900 may be performed by another element of a control system for implementing control plane functionality in flexible grid optical networks, such as control system 300 illustrated in FIG. 3. It is noted that certain operations described in method 900 may be optional or may be rearranged in different embodiments.

Method 900 may begin, at 902, by determining the physical nodes of an optical path to be added in a flexible grid optical network, including source and destination nodes, and intermediate nodes between the source and destination nodes. The routing path may be given (e.g., in a request to provision the optical path) or calculated (e.g., by determining the shortest path from the physical source node to the physical destination node in the flexible grid optical network through one or more physical intermediate nodes), in different embodiments.

At 904, the method may include determining the number of contiguous spectral slots to allocate to traffic transmitted over the optical path. For example, in various embodiments, the required number of spectral slots may be given (e.g., in a request to add the optical path) or may be calculated based on the bandwidth required for the new optical path and the width of the spectral slots in the flexible grid optical network.

At 906, the method may include identifying all possible candidate combinations of contiguous spectral slots with the determined number of spectral slots in the fiber links between each pair of neighboring physical nodes on the optical path. At 908, the method may include, mapping, in an auxiliary graph, each candidate combination of contiguous spectral slots to a respective auxiliary fiber link and adding virtual nodes including virtual source-side and virtual destination-side intermediate nodes to the auxiliary graph. In some embodiments, each auxiliary fiber link may be associated with (and identified by) the lowest slot ID value of the available spectral slots in the corresponding combination of spectral slots.

At 910, the method may include adding, in the auxiliary graph, auxiliary transition links between each pair of virtual source-side and virtual destination-side intermediate nodes in the physical intermediate nodes, each auxiliary transition link representing either pass-through traffic (when the spectral slot IDs for the traffic do not change from the source side of a physical intermediate node to the destination side) or wavelength shifted traffic (when the spectral slot IDs for the traffic change from the source side of a physical intermediate node to the destination side).

At 912, the method may include adding virtual auxiliary source nodes and virtual auxiliary destination nodes to the auxiliary graph representing connections to physical source nodes and physical destination nodes, respectively, adding a virtual source node and a virtual destination node, and adding auxiliary links between the virtual source node and the virtual auxiliary source nodes and between the virtual destination node and the virtual auxiliary destination nodes.

At 914, the method may include assigning a respective transition cost value to each auxiliary transition link based at least on whether it requires a new wavelength shifter, an existing wavelength shifter, or no wavelength shifter (e.g., if the auxiliary transition link represents pass-through traffic) and assigning a respective fiber cost value to each auxiliary fiber link. For example, in some embodiments, the transition cost values assigned to auxiliary transition links representing pass-through traffic may be lower than the transition cost values assigned to auxiliary transition links representing wavelength shifted traffic. In some embodiments, the transition cost values assigned to auxiliary transition links representing traffic that is wavelength shifted using an existing wavelength shifting component in a physical intermediate node may be lower than the transition cost values assigned to auxiliary transition links representing traffic that is wavelength shifted using a new wavelength shifting component to be installed or enabled in a physical intermediate node. In some embodiments, the fiber cost value may be dependent on the spectral slot ID associated with the candidate combination of contiguous spectral slots such that candidate combination of contiguous spectral slots associated with lower spectral slot ID values are assigned lower fiber cost values than candidate combination of contiguous spectral slots associated with higher spectral slot ID values.

At 916, method 900 may include determining, based on the auxiliary graph, the lowest cost combination of auxiliary links from the virtual source node to the virtual destination node, and determining the corresponding spectral slot assignments for the optical path. Along the identified minimum cost path, each of the auxiliary fiber links represents a selected candidate combination of contiguous spectral slots to be assigned to the new optical channel in a respective fiber link between a pair of neighboring physical nodes in the optical path, and each of the auxiliary transition links represents pass-through traffic or wavelength shifted traffic at a respective physical intermediate node in the optical path. This information may then be used to configure the physical nodes in the optical path to implement the determined solution.

At 918, the method may include configuring the physical intermediate nodes of the optical path to carry traffic on the determined spectral slots using existing or new wavelength shifter(s) where indicated in the lowest cost combination of auxiliary links.

As described herein, methods and systems enable optimized spectral slot assignment and placement of wavelength shifters when adding optical paths in flexible grid optical networks. The wavelength shifters may include O-E-O regenerators for a single wavelength and/or all optical wavelength shifters for one or more wavelengths. An auxiliary graph is created to represent various links in a provisioned optical path. By applying cost values to each of the auxiliary links in the auxiliary graph, different types of optimizations for network resource utilization may be realized. As described herein, the methods and systems for spectral slot assignment and wavelength shifter placement may use global information to overcome wavelength blocking due to spectral defragmentation in optical networks that support flexible grids and flexible baud rates. For example, the methods and systems may map available combinations of contiguous spectral slots in the flexible grid optical network that include the required number of spectral slots for a given optical path to be added to auxiliary links in the auxiliary graph. The auxiliary graph may be used to compute a solution for assigning spectral slots to traffic transmitted on the given optical path and for configuring the physical nodes on the optical path to share, enable, or add wavelength shifters where indicated in the solution.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A control system for spectral slot assignment in flexible grid optical networks, the control system comprising a processor having access to memory media storing instructions executable by the processor to:

determine, for an optical path in a flexible grid optical network, a physical source node, a physical destination node, and one or more physical intermediate nodes between the physical source node and the physical destination node;

determine a number of contiguous spectral slots to allocate to traffic transmitted over the optical path, each spectral slot representing a predefined portion of available spectral bandwidth in the flexible grid optical network;

identify, for each pair of neighboring physical nodes in the optical path, one or more candidate combinations of contiguous spectral slots that are available to allocate to traffic transmitted over the optical path, each candidate combination of contiguous spectral slots including the determined number of contiguous spectral slots;

create an auxiliary graph for the optical path, the auxiliary graph including:

for each candidate combination of contiguous spectral slots, a respective auxiliary fiber link representing the candidate combination of contiguous spectral slots;

for each auxiliary fiber link, virtual nodes representing the pair of neighboring physical nodes for which the candidate combination of contiguous spectral slots was identified, the virtual nodes for each auxiliary fiber link including a virtual source-side intermediate node representing a connection to a physical intermediate node on the side of the physical intermediate node toward the physical source node or a virtual destination-side intermediate node representing a connection to a physical intermediate node on the side of the physical intermediate node toward the physical destination node;

for each physical intermediate node between the physical source node and the physical destination node, a respective auxiliary transition link between a virtual source-side intermediate node and a virtual destination-side intermediate node for each possible pair of virtual source-side intermediate nodes and virtual destination-side intermediate nodes for the physical intermediate node represented in the auxiliary graph, each auxiliary transition link representing either:
  pass-through traffic that is received from a preceding physical node in the optical path and transmitted to a subsequent physical node in the optical path over a same combination of contiguous spectral slots; or
  wavelength shifted traffic that is received from a preceding physical node in the optical path over a given combination of contiguous spectral slots and transmitted to a subsequent physical node in the optical path over a different combination of contiguous spectral slots;
assign a respective transition cost value to each auxiliary transition link, the transition cost value dependent on whether the auxiliary transition link represents pass-through traffic or represents wavelength shifted traffic;
determine, dependent on the respective transition cost values assigned to the auxiliary transition links, a lowest cost combination of auxiliary links from the virtual source node to the virtual destination node, the lowest cost combination of auxiliary links including:
  a respective auxiliary fiber link representing a selected candidate combination of contiguous spectral slots between each pair of neighboring physical nodes in the optical path; and
  a respective auxiliary transition link for each physical intermediate node in the optical path;
for each auxiliary fiber link in the lowest cost combination of auxiliary links, allocate the selected candidate combination of contiguous spectral slots to traffic transmitted over the optical path;
for each auxiliary transition link in the lowest cost combination of auxiliary links representing pass-through traffic, configure the corresponding physical intermediate node to receive traffic from a preceding physical node in the optical path over a given combination of contiguous spectral slots and transmit the traffic to a subsequent physical node in the optical path over the given combination of contiguous spectral slots; and
for each auxiliary transition link in the lowest cost combination of auxiliary links representing wavelength shifted traffic, configure the corresponding physical intermediate node to receive traffic from a preceding physical node in the optical path over a first combination of contiguous spectral slots and transmit the traffic to a subsequent physical node in the optical path over a second combination of contiguous spectral slots.

2. The control system of claim 1, wherein each spectral slot represents a minimum sized portion of available spectral bandwidth in the flexible grid optical network.

3. The control system of claim 1, wherein:
for at least one auxiliary fiber link, the virtual nodes for the auxiliary fiber link further include a virtual auxiliary source node representing a connection to the physical source node or a virtual auxiliary destination node representing a connection to the physical destination node;
the auxiliary graph further includes:
  a virtual source node;
  a virtual destination node;
  for each virtual auxiliary source node, a respective auxiliary source link connecting the virtual auxiliary source node and the virtual source node; and
  for each virtual auxiliary destination node, a respective auxiliary destination link connecting the virtual auxiliary destination node and the virtual destination node; and
the lowest cost combination of auxiliary links further includes a selected auxiliary source link and a selected auxiliary destination link.

4. The control system of claim 1, wherein:
the memory media further store instructions executable by the processor to assign a respective fiber cost value to each auxiliary fiber link, the fiber cost value dependent on the candidate combination of contiguous spectral slots for which the auxiliary fiber link was included in the auxiliary graph;
determining the lowest cost combination of auxiliary links is further dependent on the respective fiber cost values assigned to the auxiliary fiber links.

5. The control system of claim 1, wherein:
the transition cost value assigned to an auxiliary transition link representing pass-through traffic is lower than the transition cost value assigned to an auxiliary transition link representing wavelength shifted traffic.

6. The control system of claim 1, wherein:
for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots comprises generating instructions to install or enable a new wavelength shifting component in the given physical intermediate node; and
the transition cost value assigned to an auxiliary transition link representing traffic that is wavelength shifted using an existing wavelength shifting component in a physical intermediate node is lower than the transition cost value assigned to the auxiliary transition link representing traffic that is wavelength shifted using the new wavelength shifting component to be installed or enabled in the given physical intermediate node.

7. The control system of claim 1, wherein
for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots comprises configuring the given physical intermediate node to perform wavelength shifting for the optical path using an existing wavelength shifting component that shifts traffic from the first combination of contiguous spectral slots to the second combination of contiguous spectral slots; and
the transition cost value assigned to the auxiliary transition link representing traffic that is wavelength shifted using the existing wavelength shifting component the given physical intermediate node is lower than the transition cost value assigned to an auxiliary transition link representing traffic that is wavelength shifted using a new wavelength shifting component to be installed or enabled in a physical intermediate node.

8. The control system of claim 1, wherein, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots comprises configuring an optical wavelength shifter of the given physical intermediate node to shift the traffic from the first combination of contiguous spectral slots to the second combination of contiguous spectral slots.

9. The control system of claim 1, wherein, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots comprises configuring an optoelectronic wavelength convertor of the given physical intermediate node to shift the traffic from the first combination of contiguous spectral slots to the second combination of contiguous spectral slots.

10. The control system of claim 1, wherein the determined number of contiguous spectral slots to allocate to traffic transmitted over the optical path comprises two or more contiguous spectral slots.

11. A method for spectral slot assignment in flexible grid optical networks, comprising:
  determining, for an optical path in a flexible grid optical network, a physical source node, a physical destination node, and one or more physical intermediate nodes between the physical source node and the physical destination node;
  determining a number of contiguous spectral slots to allocate to traffic transmitted over the optical path, each spectral slot representing a predefined portion of available spectral bandwidth in the flexible grid optical network;
  identifying, for each pair of neighboring physical nodes in the optical path, one or more candidate combinations of contiguous spectral slots that are available to allocate to traffic transmitted over the optical path, each candidate combination of contiguous spectral slots including the determined number of contiguous spectral slots;
  creating an auxiliary graph for the optical path, the auxiliary graph including:
    for each candidate combination of contiguous spectral slots, a respective auxiliary fiber link representing the candidate combination of contiguous spectral slots;
    for each auxiliary fiber link, virtual nodes representing the pair of neighboring physical nodes for which the candidate combination of contiguous spectral slots was identified, the virtual nodes for each auxiliary fiber link including a virtual source-side intermediate node representing a connection to a physical intermediate node on the side of the physical intermediate node toward the physical source node or a virtual destination-side intermediate node representing a connection to a physical intermediate node on the side of the physical intermediate node toward the physical destination node;
    for each physical intermediate node between the physical source node and the physical destination node, a respective auxiliary transition link between a virtual source-side intermediate node and a virtual destination-side intermediate node for each possible pair of virtual source-side intermediate nodes and virtual destination-side intermediate nodes for the physical intermediate node represented in the auxiliary graph, each auxiliary transition link representing either:
      pass-through traffic that is received from a preceding physical node in the optical path and transmitted to a subsequent physical node in the optical path over a same combination of contiguous spectral slots; or
      wavelength shifted traffic that is received from a preceding physical node in the optical path over a given combination of contiguous spectral slots and transmitted to a subsequent physical node in the optical path over a different combination of contiguous spectral slots;
  assigning a respective transition cost value to each auxiliary transition link, the transition cost value dependent on whether the auxiliary transition link represents pass-through traffic or represents wavelength shifted traffic;
  determining, dependent on the respective transition cost values assigned to the auxiliary transition links, a lowest cost combination of auxiliary links from the virtual source node to the virtual destination node, the lowest cost combination of auxiliary links including:
    a respective auxiliary fiber link representing a selected candidate combination of contiguous spectral slots between each pair of neighboring physical nodes in the optical path; and
    a respective auxiliary transition link for each physical intermediate node in the optical path;
  for each auxiliary fiber link in the lowest cost combination of auxiliary links, allocating the selected candidate combination of contiguous spectral slots to traffic transmitted over the optical path; and
  for a first auxiliary transition link in the lowest cost combination of auxiliary links representing wavelength shifted traffic, configuring the corresponding physical intermediate node to receive traffic from a preceding physical node in the optical path over a first combination of contiguous spectral slots and transmit the traffic to a subsequent physical node in the optical path over a second combination of contiguous spectral slots.

12. The method of claim 11, further comprising:
  for a second auxiliary transition link in the lowest cost combination of auxiliary links representing pass-through traffic, configuring the corresponding physical intermediate node to receive traffic from a preceding physical node in the optical path over a given combination of contiguous spectral slots and transmit the traffic to a subsequent physical node in the optical path over the given combination of contiguous spectral slots.

13. The method of claim 11, wherein:
  for at least one auxiliary fiber link, the virtual nodes for the auxiliary fiber link further include a virtual auxiliary source node representing a connection to the physical source node or a virtual auxiliary destination node representing a connection to the physical destination node;
  the auxiliary graph further includes:
    a virtual source node;
    a virtual destination node;
    for each virtual auxiliary source node, a respective auxiliary source link connecting the virtual auxiliary source node and the virtual source node; and
    for each virtual auxiliary destination node, a respective auxiliary destination link connecting the virtual auxiliary destination node and the virtual destination node; and the lowest cost combination of auxiliary links further includes a selected auxiliary source link and a selected auxiliary destination link.

14. The method of claim 11, wherein:
the method further comprises assigning a respective fiber cost value to each auxiliary fiber link, the fiber cost value dependent on the candidate combination of contiguous spectral slots for which the auxiliary fiber link was included in the auxiliary graph;
determining the lowest cost combination of auxiliary links is further dependent on the respective fiber cost values assigned to the auxiliary fiber links.

15. The method of claim 11, wherein:
the transition cost value assigned to an auxiliary transition link representing pass-through traffic is lower than the transition cost value assigned to an auxiliary transition link representing wavelength shifted traffic.

16. The method of claim 11, wherein:
for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots comprises generating instructions to install or enable a new wavelength shifting component in the given physical intermediate node; and
the transition cost value assigned to an auxiliary transition link representing traffic that is wavelength shifted using an existing wavelength shifting component in a physical intermediate node is lower than the transition cost value assigned to the auxiliary transition link representing traffic that is wavelength shifted using the new wavelength shifting component to be installed or enabled in the given physical intermediate node.

17. The method of claim 11, wherein
for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots comprises configuring the given physical intermediate node to perform wavelength shifting for the optical path using an existing wavelength shifting component that shifts traffic from the first combination of contiguous spectral slots to the second combination of contiguous spectral slots; and
the transition cost value assigned to the auxiliary transition link representing traffic that is wavelength shifted using the existing wavelength shifting component in the given physical intermediate node is lower than the transition cost value assigned to an auxiliary transition link representing traffic that is wavelength shifted using a new wavelength shifting component to be installed or enabled in a physical intermediate node.

18. The method of claim 11, wherein, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots comprises configuring an optical wavelength shifter of the given physical intermediate node to shift the traffic from the first combination of contiguous spectral slots to the second combination of contiguous spectral slots.

19. The method of claim 11, wherein, for a given physical intermediate node, configuring the given physical intermediate node to receive traffic from a preceding physical node in the optical path over a first combination of contiguous spectral slots and transmit the traffic to a subsequent physical node in the optical path over a second combination of contiguous spectral slots comprises configuring an optoelectronic wavelength convertor of the given physical intermediate node to shift the traffic from the first combination of contiguous spectral slots to the second combination of contiguous spectral slots.

20. The method of claim 11, wherein the determined number of contiguous spectral slots to allocate to traffic transmitted over the optical path comprises two or more contiguous spectral slots.

* * * * *